United States Patent [19]

Lake, Jr.

[11] Patent Number: 5,051,734
[45] Date of Patent: Sep. 24, 1991

[54] SPECIAL EFFECTS USING POLAR IMAGE COORDINATES

[75] Inventor: David E. Lake, Jr., Grass Valley, Calif.

[73] Assignee: The Grass Valley Group, Inc., Nevada City, Calif.

[21] Appl. No.: 463,702

[22] Filed: Jan. 11, 1990

[51] Int. Cl.$^5$ .............................................. G09G 1/00
[52] U.S. Cl. ..................................... 340/700; 364/731
[58] Field of Search ................ 364/731; 340/700, 712; 358/140, 101

[56] References Cited

U.S. PATENT DOCUMENTS

| | | | |
|---|---|---|---|
| 3,671,723 | 6/1972 | Deligniere et al. | 364/731 |
| 3,952,187 | 4/1976 | Robinson et al. | 364/731 |
| 4,106,021 | 8/1978 | Katagi | 364/731 |
| 4,581,636 | 4/1986 | Blaker et al. | 358/140 |
| 4,693,608 | 9/1987 | Kitagawa et al. | 358/101 |
| 4,737,905 | 4/1988 | Yoshida et al. | 364/731 |
| 4,754,279 | 6/1988 | Cribbs | 358/140 |
| 4,759,076 | 7/1988 | Tanaka et al. | 364/731 |

*Primary Examiner*—Ulysses Weldon
*Assistant Examiner*—Doom Yue Chow
*Attorney, Agent, or Firm*—Francis I. Gray; John Smith-Hill

[57] ABSTRACT

Special effects using polar image coordinates produce a new class of television special effects, such as spherical mapping and kaleidoscope effects. Rectangular coordinates for an input image are converted into polar coordinates, and the polar coordinates are mathematically manipulated according to the desired special effect. The modified polar coordinates may be applied directly to the rectangular coordinates to produce modified rectangular coordinates that represent the desired special effect, or they may be converted back into rectangular coordinates as the modified rectangular coordinates.

19 Claims, 2 Drawing Sheets

SPECIAL EFFECTS USING POLAR IMAGE COORDINATES

BACKGROUND OF THE INVENTION

The present invention relates to television special effects devices, and more particularly to special effects using polar image coordinates to produce a new class of television special effects.

Images are manipulated in digital picture manipulator (DPM) systems by mapping pixels from their original positions in a raster to other positions in a new raster. Usually this is accomplished by applying a mathematical function to the address (defined by a pair of coordinates) of each pixel. The function returns a new coordinate pair for the pixel. The two pairs of coordinates form a map relating the original position to the new position. Two general map types exist: a forward map and a reverse map. The forward map uses the original pixel coordinates as arguments to the mapping function. The function returns the address to which the pixel is to be moved. A forward mapping function answers the question—for each pixel in the image where does it go in the new output image? A reverse map is the opposite case. Coordinates from the output image are used as arguments to the mapping function. The mapping function returns coordinates in the input image from which the pixel comes. A reverse mapping function answers the question—for each pixel in the output image where do I go in the input picture to get the pixel? The reverse mapping system is the dominant implementation used in current DPM systems.

In video applications pixels normally are transferred in an ordered fashion known as scan line order. Pixels transfer from upper left to lower right of the image. The pixel addresses with respect to the screen can then be generated with simple counters that are incremented and reset by the normal video blanking signals. This X-Y addressing method is inherently a rectangular coordinate system. The mapping functions operate on these counter generated X and Y coordinates to produce the new mapped coordinates. The mapping function determines what the image will look like after the transformation. Implementation of a mathematical operation on these addresses is performed by dedicated hardware. The more complex the function, the more complex the hardware. Certain mathematical operations are fairly simple to implement, such as algebraic addition and multiplication, while others are more difficult, such as division, trigonometric and logarithmic functions and the like. Usually linear operations are implemented directly with adders and perhaps multipliers. Non-linear operations are usually implemented with lookup tables based in a memory device, either ROM or RAM. Hitherto, the polar to rectangular, and back, transformation set required non-linear operations of square roots and trigonometric and inverse trigonometric functions to be performed with an accuracy well beyond the practical application of lookup table techniques, and so were never really considered as possibilities to be used in mapping functions.

Thus what is desired are special effects using polar coordinates that are practical and can be used in either forward or reverse mapping functions.

SUMMARY OF THE INVENTION

Accordingly the present invention provides special effects using polar coordinates by converting the rectangular coordinates of an image into polar coordinates (R, $\phi$). The polar coordinates are modified by either arithmetic or lookup table techniques. The result of the function on R and/or $\phi$ may be used to modify the original X-Y coordinates directly, or may be converted back to rectangular coordinates and then used to address a video frame store.

The objects, advantages and other novel features of the present invention are apparent from the following detailed description when read in conjunction with the appended claims and attached drawing.

DESCRIPTION OF THE PREFERRED EMBODIMENT

Figure 1:
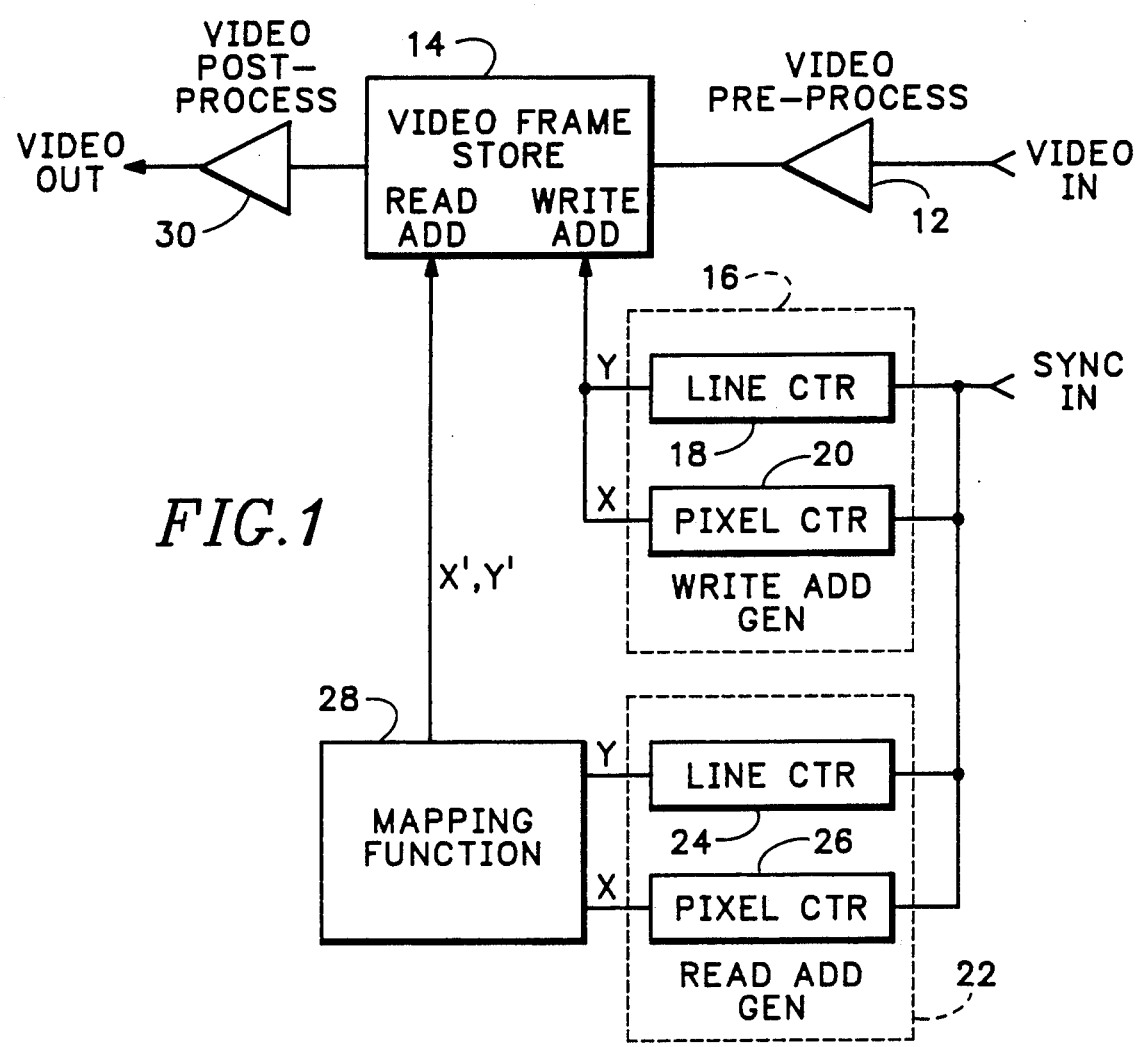
FIG. 1 is a block diagram of a digital picture manipulator device using a reverse addressing process.

Referring now to FIG. 1 a video signal is input to a pre-processing stage 12 that provides functions such as decoding, sampling, analog to digital converting and the like. The pre-processed video signal is then input to a video frame store 14 at locations determined by write addresses from a write address generator 16. The write addresses are determined from sync signals that are input to respective counters 18, 20 to produce the rectangular address pairs X and Y. The same or, in many systems, separate sync signals are input also to a read address generator 22 that has respective counters 24, 26 to generate a corresponding read address in rectangular X-Y coordinates. The X and Y read addresses are input to a mapping function circuit 28 to perform a desired special effect transformation that produces new read addresses X' and Y' that are used to transfer the pre-processed video signal from the video frame store 14 to a video post-processing circuit 30 that performs such functions as encoding, digital to analog converting and the like on the transformed video signal to produce an output video signal. Although the described DPM system is a reverse system, a forward system may also be used by mapping the write addresses rather than the read addresses.

Figure 2:
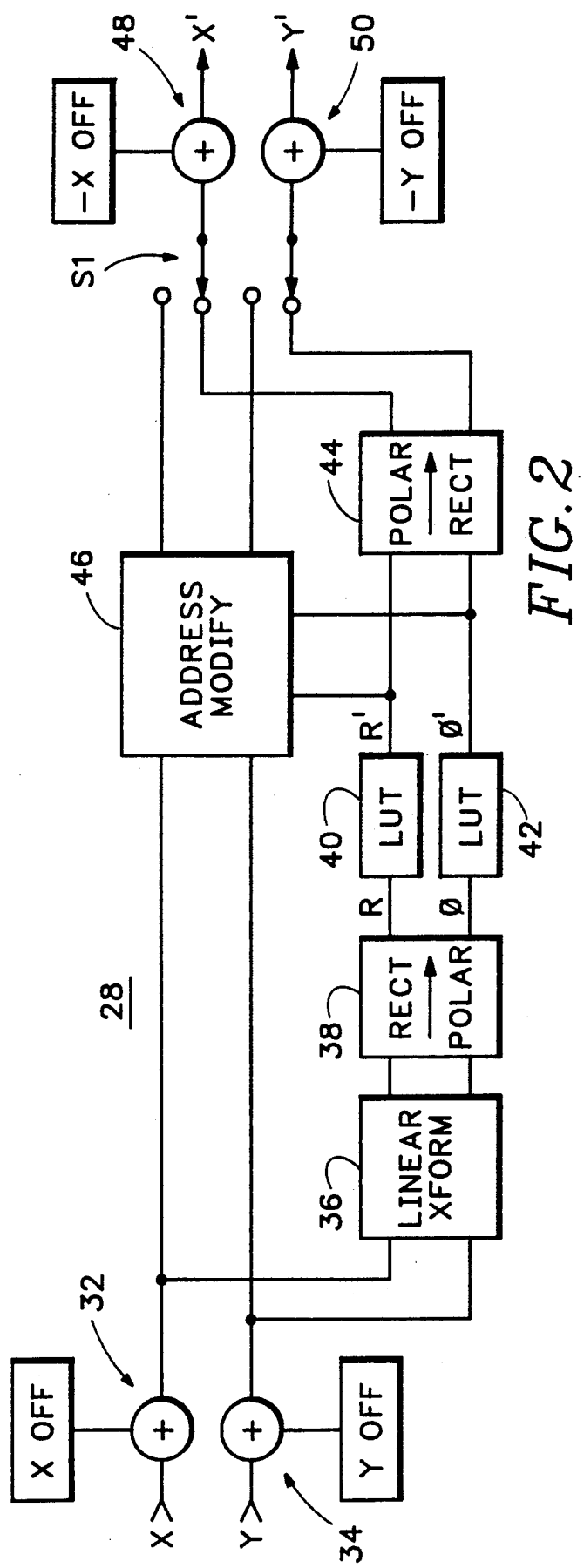
FIG. 2 is a block diagram of mapping function hardware including polar transformation hardware according to the present invention.

The mapping function circuit 28 is shown in detail in FIG. 2. The X-Y coordinates that are input to the circuit 28 may be in any given order and may have undergone some form of mapping from original target screen coordinates. Offset adders 32, 34 translate the image coordinates so that the center point of the effect can be moved relative to the image. A linear transform circuit 36 scales/rotates/offsets the coordinates from the offset adders 32, 34 prior to performing coordinate conversion. The coordinates from the transform circuit 36 are input to a rectangular to polar converter 38, such as a TMC2330 integrated circuit from TRW Semiconductor Corporation of La Jolla, Calif. that converts rectangular coordinates to polar coordinates and vice-versa, to produce R and $\phi$ polar coordinates. Once the conversion from X-Y to R-$\phi$ is performed, the polar coordinates are subjected to a mathematical operation which may be performed by respective lookup tables 40, 42 or any other suitable means to produce new polar coordinates R' and $\phi'$. These modified polar coordinates may then be converted back to rectangular coordinates by a polar to rectangular converter 44 or may be used to modify the input X and Y values in an address modifier circuit 46. A switch S1 selects either the modified rectangular coordinates from the address modifier circuit 46 or the converted X' and Y' values from the polar to rectangular converter 44 as outputs. The outputs from the switch S1 are input to negative offset adders 48, 50 to position the resulting effect. The resulting X' and Y' coordinates may be used as an address to select pixels in the video frame store 14 or further modification may be performed to implement additional effects. Several mappings may be cascaded. For example, the X-Y values may be mapped by standard planar 3D DPM transformations followed by polar coordinate mapping, and the resulting X'-Y' coordinates may be further processed by picture split and drop shadow operations before final coordinates are produced to access the video frame store 14.

Figure 3:
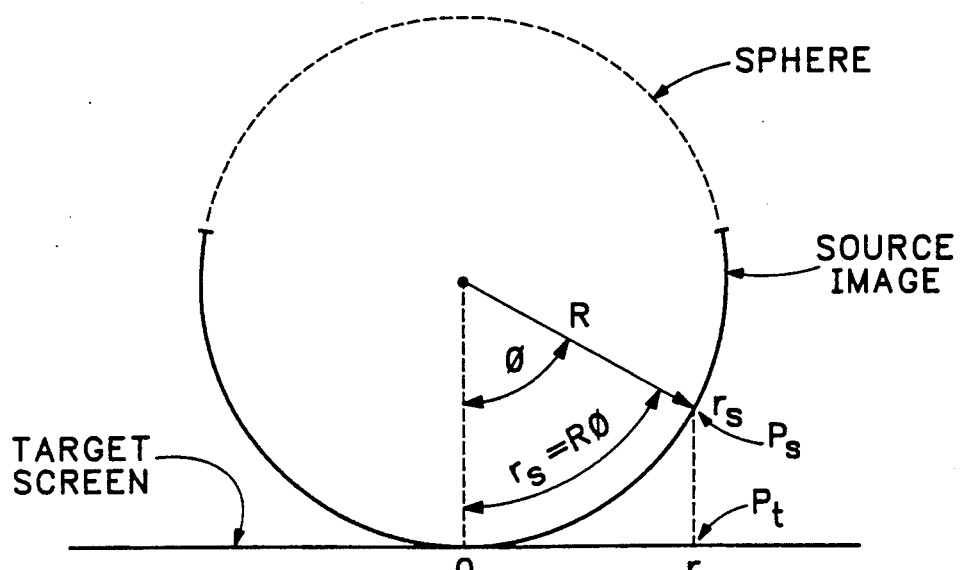
FIG. 3 is an illustration of the application of the present invention for sphere mapping.

FIG. 3 illustrates one possible effect that may be produced using the architecture of FIG. 2. There is a desire to make the input image appear as if it were stretched around a sphere. In the two dimensional projection of this effect sphere mapping is a radial compression of the image. Near the center of the sphere the image is nearly undistorted, while if any line is followed from the center of the sphere outward toward the edge of the sphere the image undergoes a compression along the direction of that radial line. In a reverse addressing system the coordinates of the output screen are given, and from these the corresponding coordinates in the source image are determined. In a sphere any cross-section may be chosen if working in polar coordinates, and the problem reduces to a one dimensional case. Given any pixel, $P_t$, at $(X_t, Y_t)$ in the target screen, it lies some distance, $r_t$, from the tangent point O of the sphere with arbitrary radius R along a radius having a constant angular position, $\phi_t$, in the target screen. If the source image is viewed as if wrapped around this sphere, then for a corresponding source image point, $P_s$, an $r_s$ for the source image may be determined. This $r_s$ may then be used to find the source image coordinates $(X_s, Y_s)$. The construction to find $r_s$ follows these lines:

a. for a given target pixel a rectangular to polar conversion yields $(r_t, \phi_t)$;

b. a perpendicular line is dropped from the target screen at the target pixel, $P_t$, to determine the point, $P_s$, of intersection with the sphere, if any;

c. the arc length along the surface of the sphere from the sphere-screen tangent point O to this intersection, $P_s$, is a new radius $r_s$ in the source input image;

d. once $r_s$ is determined a polar to rectangular conversion may be used to extract the source coordinates. Only $r_t$ is modified in this process, $\phi_t$ is left alone. $\phi_t$ should not be confused with the intersection angle $\phi$ of the sphere.

The source polar $r_s$ is determined by simple trigonometry. Sphere radius R is multiplied by intersection angle $\phi$ to produce $r_s$:

$$r_s = R\phi$$

$$\sin(\phi) = r_t/R$$

$$\phi = \arcsin(r_t/R)$$

and combining all terms $$r_s = R \arcsin(r_t/R).$$

This relation may be precomputed and loaded into the lookup table 40 so $r_s$ is obtained from $r_t$ by simple lookup techniques.

A first improvement is to remove the necessity of a polar to rectangular conversion after obtaining $r_s$. A pair of polar coordinates define a vector. Because $\phi_t$ is not changed, then $r_s$ is simply a scaled version of $r_t$. The rectangular coordinates are the components of this polar coordinate vector. Scaling the magnitude of a vector without changing its direction may be achieved by scaling both components by the same value. The scaling factor is:

$$s = r_s/r_t$$

$$s = R \arcsin(r_t/R)/r_t.$$

The values for s may be precomputed and loaded into the lookup table 40 instead. Then source coordinates may be obtained by:

$$X_s = sX_t; \quad Y_s = sY_t.$$

The multiplication operation may be accomplished in the address modifier circuit 46.

A further improvement to performance may be accomplished by interpolating between adjacent lookup table values. Lookup tables are of finite length. When an argument value serves as an index to the table there is probably not a discrete location in the table corresponding to the desired value. The simplest method is to use the closest table element, usually by rounding the argument from a fixed point format to an integer to be used as an address. A better method is to look up two values, one on either side of the desired element, and linearly interpolate these values to produce a closer estimate to the actual function value. This technique fixes a variety of contouring, stair stepping and jagged edge problems associated with the simple method.

Referring again to FIG. 2 the linear transformation circuit 36 in front of the rectangular to polar converter 38 may be used to augment the spherical effect. Normally this circuit is used to scale line coordinates (Y) to the same spatial dimension as the pixel coordinates (X). By intentionally perturbing this value, the effect is to flatten or elongate the sphere around which the image is wrapped. Also by adjusting the scaling factor s that is loaded into the lookup table 40 it is possible to adjust the stretching of the source image around the sphere. By creating two modified s values, one for X and one for Y, then the image stretch may be adjusted in the horizontal and vertical directions independently.

Other effects may be achieved by using this scaling only $r_t$ approach. A very nice effect is to ripple the image as if it lay on the surface of water with waves on the surface. Traditionally this effect has been known as a type of oil dissolve. The technique is optical, being taken from the film industry. A tank of clear fluid, usually oil, is set up so that an image is projected through the air/oil surface boundary and a camera is used to record the resulting image. The surface of the fluid is disturbed by some means and the ripples distort the image passing through them. Now however modifications to the $r_t$ coordinate are performed in the lookup table 40. Various waveforms may be used, with the sine wave being the most obvious. The output of the lookup table 40 is then used to scale the $X_t$ and $Y_t$ coordinates in the same manner as the sphere. The effect is very similar to the oil tank effects. The offset adders 32, 34 are used to adjust the center of the disturbance relative to the image, and the linear transform circuit 36 is used to adjust the circular symmetry of the ripples.

Other effects are possible using the angle information, either to scale the $r_t$ magnitude or change $\phi_t$. For radial modulations the angle $\phi_t$ may be used to index the lookup table 42 containing some function. The output of the table then is used to scale the $X_t$ and $Y_t$ coordinates. This allows the image to be circularly ruffled or modulated into flower shapes, nautilus shells, hearts, cardioids and other shapes.

If $\phi_t$ is used to index a triangle wave function in the lookup table 42 to produce a new $\phi$ value, then by converting the result back to rectangular coordinates with the polar to rectangular converter 44 a true kaleidoscope effect results. In a real kaleidoscope mirrors are used to reflect some wedge portion of an image back and forth around a circle. The triangle function does this by converting the angle values outside the wedge into angles that lie within the wedge. This has the identical effect as in a kaleidoscope, and requires the use of the polar to rectangular converter 44.

Thus the present invention provides special effects using polar image coordinates, converting input rectangular coordinates into polar coordinates, manipulating the polar coordinates according to a specified function to produce the desired function, and either directly modifying the input rectangular coordinates or converting the modified polar coordinates back into rectangular coordinates.

What is claimed is:

1. A mapping function circuit comprising:
   means for converting rectangular coordinate values representing a location of an input pixel into corresponding polar coordinate values;
   means for manipulating the polar coordinate values to produce modified polar coordinate values according to a desired effect; and
   means for modifying the rectangular coordinate values by the modified polar coordinate values to produce modified rectangular coordinate values representing the desired effect.

2. A mapping function circuit as recited in claim 1 further comprising means for converting the modified polar coordinate values into corresponding rectangular coordinate values to produce alternative modified rectangular coordinate values.

3. A mapping function circuit as recited in claim 2 further comprising means for switching between the output of the modifying means and the output of the polar to rectangular converting means as the source of output modified rectangular coordinate values.

4. A mapping function circuit as recited in claim 1 further comprising means for linearly transforming the rectangular coordinate values prior to input to the converting means.

5. A mapping function circuit as recited in claim 1 further comprising means for offsetting the rectangular coordinate values prior to input to the modifying means and the converting means.

6. A mapping function circuit as recited in claim 1 further comprising means for offsetting the modified rectangular coordinate values.

7. A mapping function circuit as recited in claim 1 wherein the modifying means comprises an arithmetic unit.

8. A mapping function circuit as recited in claim 7 wherein the arithmetic unit comprises a multiplier.

9. A digital picture manipulation apparatus comprising:
   a video frame store having a video input and first and second address inputs, one of which is a write address input and the other of which is a read address input, and a manipulated video output;
   first and second address generators each having a sync input and an address output, the address output of each address generator having an X part and a Y part, the address output of the first address generator being coupled to the first address input of the video frame store; and
   a mapping function circuit having an X input coupled to the X part of the address output of the second address generator, a Y input coupled to the Y part of the address output of the second address generator, and an address output that has an X' part and a Y' part and is coupled to the second address input of the video frame store, the mapping function circuit comprising:
   means for converting rectangular coordinate values X,Y representing an address generated by the second address generator into corresponding polar coordinate values R,$\phi$;
   means for manipulating the polar R,$\phi$ values to produce modified polar coordinate values R',$\phi$' according to a desired effect; and
   means for deriving modified rectangular coordinate values X',Y' representing the desired effect from the modified polar coordinate values R', $\phi$'.

10. A digital picture manipulation apparatus as recited in claim 9 wherein the address output of the first address generator is coupled to the write address input of the video frame store.

11. A digital picture manipulation apparatus as recited in claim 9 wherein the deriving means comprises means for modifying the rectangular coordinates values X,Y by the modified polar coordinate values R',$\phi$' to produce the modified rectangular coordinate values X',Y'.

12. A mapping function circuit as recited in claim 11 wherein the modifying means comprises an arithmetic unit.

13. A mapping function circuit as recited in claim 12 wherein the arithmetic unit comprises a multiplier.

14. A digital picture manipulation apparatus as recited in claim 11 wherein the mapping function circuit comprises means for offsetting the rectangular coordinate values X,Y prior to input to the modifying means.

15. A digital picture manipulation apparatus as recited in claim 9 wherein the deriving means comprises means for converting the modified polar coordinate values R', $\phi$' to corresponding rectangular coordinate values, which are the modified rectangular coordinate values X', Y'.

16. A digital picture manipulation apparatus as recited in claim 9 wherein the deriving means comprise means for modifying the rectangular coordinate values X,Y by the modified polar coordinate values R',$\phi$' to produce first modified rectangular coordinate values, means for converting the modified polar coordinate values R',φ' to corresponding rectangular coordinate values, which are second modified rectangular coordinate values, and means for switching between the first modified rectangular coordinate values and the second modified rectangular coordinate values to select output modified coordinate values X',Y'.

17. A digital picture manipulation apparatus as recited in claim 9 wherein the deriving means comprises means for obtaining initial modified rectangular coordinate values and means for offsetting the initial modified rectangular coordinate values to produce modified rectangular coordinate values X',Y'.

18. A digital picture manipulation apparatus as recited in claim 9 wherein the mapping function circuit comprises means for linearly transforming the rectangular coordinate values X,Y prior to input to the converting means.

19. A digital picture manipulation apparatus as recited in claim 9 wherein the mapping function circuit comprises means for offsetting the rectangular coordinate values X,Y prior to input to the converting means.

* * * * *